US010202836B2

(12) United States Patent
Veldman et al.

(10) Patent No.: US 10,202,836 B2
(45) Date of Patent: Feb. 12, 2019

(54) METHODS FOR FRACTURING FORMATIONS USING AGGREGATING COMPOSITIONS

(71) Applicant: LUBRIZOL OILFIELD SOLUTIONS, INC., Wickliffe, OH (US)

(72) Inventors: Raynard Veldman, Houston, TX (US); Sarkis R. Kakadjian, Houston, TX (US); Frank Zamora, Houston, TX (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 15/615,737

(22) Filed: Jun. 6, 2017

(65) Prior Publication Data

US 2018/0016886 A1   Jan. 18, 2018

Related U.S. Application Data

(60) Division of application No. 14/582,661, filed on Dec. 24, 2014, which is a continuation of application No. 13/247,985, filed on Sep. 28, 2011, now Pat. No. 8,944,164.

(51) Int. Cl.

| | |
|---|---|
| E21B 43/267 | (2006.01) |
| C09K 8/80 | (2006.01) |
| E21B 43/02 | (2006.01) |
| C09K 8/03 | (2006.01) |
| C09K 8/508 | (2006.01) |
| C09K 8/02 | (2006.01) |
| E21B 7/00 | (2006.01) |

(52) U.S. Cl.
CPC .............. *E21B 43/267* (2013.01); *C09K 8/02* (2013.01); *C09K 8/03* (2013.01); *C09K 8/5086* (2013.01); *C09K 8/805* (2013.01); *E21B 7/00* (2013.01); *E21B 43/025* (2013.01)

(58) Field of Classification Search
CPC .......... C09K 8/24; C09K 8/487; C09K 8/588; C09K 8/68; C09K 8/882; E21B 43/16; E21B 43/26; E21B 43/38; E21B 21/06
See application file for complete search history.

(56) References Cited

U.S. PATENT DOCUMENTS

| | | |
|---|---|---|
| 2,196,042 A | 4/1940 | Timpson |
| 2,390,153 A | 12/1945 | Kern |
| 2,805,958 A | 7/1959 | Bueche et al. |
| 3,059,909 A | 10/1962 | Wise |
| 3,163,219 A | 12/1964 | Wyant et al. |
| 3,301,723 A | 1/1967 | Chrisp |
| 3,301,848 A | 1/1967 | Halleck |
| 3,303,896 A | 2/1967 | Tillotson et al. |
| 3,317,430 A | 5/1967 | Priestley et al. |
| 3,565,176 A | 2/1971 | Wittenwyler |
| 3,856,921 A | 12/1974 | Shrier et al. |
| 3,888,312 A | 6/1975 | Tiner et al. |
| 3,933,205 A | 1/1976 | Kiel |
| 3,937,283 A | 2/1976 | Blauer et al. |
| 3,960,736 A | 6/1976 | Free et al. |
| 3,965,982 A | 6/1976 | Medlin |
| 3,990,978 A | 11/1976 | Hill |
| 4,007,792 A | 2/1977 | Meister |
| 4,052,159 A | 10/1977 | Fuerst et al. |
| 4,067,389 A | 1/1978 | Savins |
| 4,108,782 A | 8/1978 | Thompson |
| 4,112,050 A | 9/1978 | Satori et al. |
| 4,112,051 A | 9/1978 | Satori et al. |
| 4,112,052 A | 9/1978 | Satori et al. |
| 4,113,631 A | 9/1978 | Thompson |
| 4,378,845 A | 4/1983 | Medlin et al. |
| 4,385,935 A | 5/1983 | Skyeldal |
| 4,461,716 A | 7/1984 | Barbarin et al. |
| 4,479,041 A | 10/1984 | Fenwick et al. |
| 4,506,734 A | 3/1985 | Nolte |
| 4,514,309 A | 4/1985 | Wadhwa |
| 4,541,935 A | 9/1985 | Constien et al. |
| 4,549,608 A | 10/1985 | Stowe et al. |
| 4,561,985 A | 12/1985 | Glass, Jr. et al. |
| 4,623,021 A | 11/1986 | Stowe |
| 4,654,266 A | 3/1987 | Kachnik |

(Continued)

FOREIGN PATENT DOCUMENTS

| | | |
|---|---|---|
| CA | 2125513 | 1/1995 |
| DE | 4027300 | 5/1992 |
| EP | 2251394 | 11/2010 |
| GB | 775376 | 10/1954 |
| GB | 1073338 | 6/1967 |
| JP | 10001461 | 6/1988 |
| JP | 08151422 | 11/1996 |
| JP | 10110115 | 4/1998 |
| JP | 2005194148 | 7/2005 |
| WO | 98/56497 | 12/1998 |

OTHER PUBLICATIONS

European Patent Office, International Search Report and Written Opinion for PCT/IB2012/055341 dated Mar. 11, 2013.

*Primary Examiner* — Zakiya W Bates
(74) *Attorney, Agent, or Firm* — Christopher P. Demas; Teresan W. Gilbert

(57) ABSTRACT

Methods of fracturing a formation including using a fracturing fluid including an aggregating composition including heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters or amine-phosphate reaction products during fracturing operations to alter self-aggregating properties and/or aggregation propensities of the particles, surfaces, and/or materials in or entrained in the fluid.

20 Claims, No Drawings

(56) References Cited

U.S. PATENT DOCUMENTS

| | | |
|---|---|---|
| 4,657,081 A | 4/1987 | Hodge |
| 4,660,643 A | 4/1987 | Perkins |
| 4,683,068 A | 7/1987 | Kucera |
| 4,686,052 A | 8/1987 | Baranet et al. |
| 4,695,389 A | 9/1987 | Kubala |
| 4,705,113 A | 11/1987 | Perkins |
| 4,714,115 A | 12/1987 | Uhri |
| 4,718,490 A | 1/1988 | Uhri |
| 4,724,905 A | 2/1988 | Uhri |
| 4,725,372 A | 2/1988 | Teot et al. |
| 4,739,834 A | 4/1988 | Peiffer et al. |
| 4,741,401 A | 5/1988 | Walles et al. |
| 4,748,011 A | 5/1988 | Baize |
| 4,779,680 A | 10/1988 | Sydansk |
| 4,795,574 A | 1/1989 | Syrinek et al. |
| 4,817,717 A | 4/1989 | Jennings, Jr. et al. |
| 4,830,106 A | 5/1989 | Uhri |
| 4,846,277 A | 7/1989 | Khalil et al. |
| 4,848,468 A | 7/1989 | Hazlett et al. |
| 4,852,650 A | 8/1989 | Jennings, Jr. et al. |
| 4,869,322 A | 9/1989 | Vogt, Jr. et al. |
| 4,892,147 A | 1/1990 | Jennings, Jr. et al. |
| 4,926,940 A | 5/1990 | Stromswold |
| 4,938,286 A | 7/1990 | Jennings, Jr. et al. |
| 4,978,512 A | 12/1990 | Dillon |
| 5,005,645 A | 4/1991 | Jennings, Jr. et al. |
| 5,024,276 A | 6/1991 | Borchardt |
| 5,067,556 A | 11/1991 | Fudono et al. |
| 5,074,359 A | 12/1991 | Schmidt |
| 5,074,991 A | 12/1991 | Weers |
| 5,082,579 A | 1/1992 | Dawson |
| 5,106,518 A | 4/1992 | Cooney et al. |
| 5,110,486 A | 5/1992 | Manalastas et al. |
| 5,169,411 A | 12/1992 | Weers |
| 5,224,546 A | 7/1993 | Smith et al. |
| 5,228,510 A | 7/1993 | Jennings, Jr. et al. |
| 5,246,073 A | 9/1993 | Sandiford et al. |
| 5,259,455 A | 11/1993 | Nimerick et al. |
| 5,330,005 A | 7/1994 | Card et al. |
| 5,342,530 A | 8/1994 | Aften et al. |
| 5,347,004 A | 9/1994 | Rivers et al. |
| 5,363,919 A | 11/1994 | Jennings, Jr. et al. |
| 5,465,792 A | 1/1995 | Dawson et al. |
| 5,402,846 A | 4/1995 | Jennings, Jr. et al. |
| 5,411,091 A | 5/1995 | Jennings, Jr. |
| 5,424,284 A | 6/1995 | Patel et al. |
| 5,439,055 A | 8/1995 | Card et al. |
| 5,462,721 A | 10/1995 | Pounds et al. |
| 5,472,049 A | 12/1995 | Chaffe et al. |
| 5,482,116 A | 1/1996 | El-Rabaa et al. |
| 5,488,083 A | 1/1996 | Kinsey, III et al. |
| 5,497,831 A | 3/1996 | Hainey et al. |
| 5,501,275 A | 3/1996 | Card et al. |
| 5,539,044 A | 7/1996 | Dindi et al. |
| 5,551,516 A | 9/1996 | Norman et al. |
| 5,624,886 A | 4/1997 | Dawson et al. |
| 5,635,458 A | 6/1997 | Lee et al. |
| 5,649,596 A | 7/1997 | Jones et al. |
| 5,669,447 A | 9/1997 | Walker et al. |
| 5,674,377 A | 10/1997 | Sullivan, III et al. |
| 5,688,478 A | 11/1997 | Pounds et al. |
| 5,693,837 A | 12/1997 | Smith et al. |
| 5,711,396 A | 1/1998 | Joerg et al. |
| 5,722,490 A | 3/1998 | Ebinger |
| 5,744,024 A | 4/1998 | Sullivan, III et al. |
| 5,755,286 A | 5/1998 | Ebinger |
| 5,775,425 A | 7/1998 | Weaver et al. |
| 5,787,986 A | 8/1998 | Weaver et al. |
| 5,806,597 A | 9/1998 | Tjon-Joe-Pin et al. |
| 5,807,812 A | 9/1998 | Smith et al. |
| 5,833,000 A | 11/1998 | Weaver et al. |
| 5,853,048 A | 12/1998 | Weaver et al. |
| 5,871,049 A | 2/1999 | Weaver et al. |
| 5,877,127 A | 3/1999 | Card et al. |
| 5,908,073 A | 6/1999 | Nguyen et al. |
| 5,908,814 A | 6/1999 | Patel et al. |
| 5,964,295 A | 10/1999 | Brown et al. |
| 5,979,557 A | 11/1999 | Card et al. |
| 5,980,845 A | 11/1999 | Cherry |
| 6,001,887 A | 12/1999 | Keup et al. |
| 6,016,871 A | 1/2000 | Burts, Jr. |
| 6,035,936 A | 3/2000 | Whalen |
| 6,047,772 A | 4/2000 | Weaver et al. |
| 6,054,417 A | 4/2000 | Graham et al. |
| 6,059,034 A | 5/2000 | Rickards et al. |
| 6,060,436 A | 5/2000 | Snyder et al. |
| 6,069,118 A | 5/2000 | Hinkel et al. |
| 6,123,394 A | 9/2000 | Jeffrey |
| 6,133,205 A | 10/2000 | Jones |
| 6,147,034 A | 11/2000 | Jones et al. |
| 6,162,449 A | 12/2000 | Maier et al. |
| 6,162,766 A | 12/2000 | Muir et al. |
| 6,169,058 B1 | 1/2001 | Le et al. |
| 6,228,812 B1 | 5/2001 | Dawson et al. |
| 6,247,543 B1 | 6/2001 | Patel et al. |
| 6,267,938 B1 | 7/2001 | Warrender et al. |
| 6,283,212 B1 | 9/2001 | Hinkel et al. |
| 6,291,405 B1 | 9/2001 | Lee et al. |
| 6,330,916 B1 | 12/2001 | Rickards et al. |
| 6,725,931 B2 | 4/2004 | Nguyen et al. |
| 6,756,345 B2 | 6/2004 | Pakulski et al. |
| 6,793,018 B2 | 9/2004 | Dawson et al. |
| 6,832,650 B2 | 12/2004 | Nguyen et al. |
| 6,875,728 B2 | 4/2005 | Gupta et al. |
| 7,268,100 B2 | 9/2007 | Kippie et al. |
| 7,350,579 B2 | 4/2008 | Gatlin et al. |
| 7,392,847 B2 | 7/2008 | Gatlin et al. |
| 7,517,447 B2 | 4/2009 | Gatlin |
| 7,565,933 B2 | 7/2009 | Kippie et al. |
| 7,566,686 B2 | 7/2009 | Kippie et al. |
| 7,712,535 B2 | 5/2010 | Venditto et al. |
| 7,767,628 B2 | 8/2010 | Kippie et al. |
| 7,829,510 B2 | 11/2010 | Gatlin et al. |
| 7,886,824 B2 | 2/2011 | Kakadjian et al. |
| 7,915,203 B2 | 3/2011 | Falana et al. |
| 7,932,214 B2 | 4/2011 | Zamora et al. |
| 7,942,201 B2 | 5/2011 | Ekstrand et al. |
| 7,956,017 B2 | 6/2011 | Gatlin et al. |
| 7,956,217 B2 | 6/2011 | Falana et al. |
| 7,971,659 B2 | 7/2011 | Gatlin et al. |
| 7,989,404 B2 | 8/2011 | Kakadjian et al. |
| 7,992,653 B2 | 8/2011 | Zamora et al. |
| 8,011,431 B2 | 9/2011 | van Petegem et al. |
| 8,028,755 B2 | 10/2011 | Darnell et al. |
| 8,034,750 B2 | 10/2011 | Thompson et al. |
| 8,084,401 B2 | 12/2011 | Lukocs et al. |
| 8,093,431 B2 | 1/2012 | Falana et al. |
| 8,097,567 B2 | 1/2012 | Wilson, Jr. |
| 8,141,661 B2 | 3/2012 | Kakadjian et al. |
| 8,158,562 B2 | 4/2012 | Wilson, Jr. et al. |
| 8,172,952 B2 | 5/2012 | Wanner et al. |
| 8,220,546 B2 | 7/2012 | Kakadjian et al. |
| 8,258,339 B2 | 9/2012 | Falana et al. |
| 8,273,693 B2 | 9/2012 | Schwartz |
| 8,287,640 B2 | 10/2012 | Zamora et al. |
| 8,362,298 B2 | 1/2013 | Falana et al. |
| 8,466,094 B2 | 6/2013 | Kakadjian et al. |
| 8,475,585 B2 | 7/2013 | Zamora et al. |
| 8,507,412 B2 | 8/2013 | Lukocs et al. |
| 8,507,413 B2 | 8/2013 | Wilson, Jr. et al. |
| 8,524,639 B2 | 9/2013 | Falana et al. |
| 8,530,394 B2 | 9/2013 | Gatlin |
| 8,563,481 B2 | 10/2013 | Gatlin et al. |
| 8,714,283 B2 | 5/2014 | Gatlin et al. |
| 8,728,989 B2 | 5/2014 | Kakadjian et al. |
| 8,772,203 B2 | 7/2014 | Schwartz |
| 8,835,364 B2 | 9/2014 | Thompson et al. |
| 8,841,240 B2 | 9/2014 | Kakadjian et al. |
| 8,846,585 B2 | 9/2014 | Falana et al. |
| 8,851,174 B2 | 10/2014 | Zamora et al. |
| 8,871,694 B2 | 10/2014 | Kakadjian et al. |
| 8,899,328 B2 | 12/2014 | Zamora et al. |
| 8,932,996 B2 | 1/2015 | Falana et al. |
| 8,944,164 B2 | 2/2015 | Veldman et al. |

(56) References Cited

U.S. PATENT DOCUMENTS

| | | |
|---|---|---|
| 8,946,130 B2 | 2/2015 | Zamora et al. |
| 8,950,493 B2 | 2/2015 | van Petegem et al. |
| 2010/0252262 A1 | 10/2010 | Ekstrand et al. |
| 2010/0292108 A1 | 11/2010 | Kakadjian et al. |
| 2010/0305010 A1 | 12/2010 | Falana et al. |
| 2010/0311620 A1 | 12/2010 | Kakadjian et al. |
| 2011/0001083 A1 | 1/2011 | Falana et al. |
| 2011/0177982 A1 | 7/2011 | Ekstrand et al. |
| 2011/0240131 A1 | 10/2011 | Parker |
| 2012/0071367 A1 | 3/2012 | Falana et al. |
| 2012/0073813 A1 | 3/2012 | Zamora et al. |
| 2012/0097893 A1 | 4/2012 | Wanner et al. |
| 2012/0273206 A1 | 11/2012 | Zamora et al. |
| 2012/0279727 A1 | 11/2012 | Kakadjian et al. |
| 2012/0295820 A1 | 11/2012 | Falana et al. |
| 2012/0302468 A1 | 11/2012 | Falana et al. |
| 2012/0325329 A1 | 12/2012 | Schwartz |
| 2013/0081820 A1 | 4/2013 | Falana et al. |
| 2013/0096038 A1 | 4/2013 | Kim et al. |
| 2013/0175477 A1 | 7/2013 | Falana et al. |
| 2013/0270012 A1 | 10/2013 | Kakadjian et al. |
| 2013/0274151 A1 | 10/2013 | Kakadjian et al. |
| 2013/0312977 A1 | 11/2013 | Lembcke et al. |
| 2013/0331301 A1 | 12/2013 | Falana et al. |
| 2014/0087977 A1 | 3/2014 | Kim et al. |
| 2014/0128294 A1 | 5/2014 | Gatlin et al. |
| 2014/0128308 A1 | 5/2014 | Levey et al. |
| 2014/0166285 A1 | 6/2014 | Santra et al. |
| 2014/0262287 A1 | 9/2014 | Treybig et al. |
| 2014/0262319 A1 | 9/2014 | Treybig et al. |
| 2014/0303048 A1 | 10/2014 | Kakadjian et al. |
| 2014/0315763 A1 | 10/2014 | Kakadjian et al. |
| 2014/0318793 A1 | 10/2014 | van Petergem et al. |
| 2014/0318795 A1 | 10/2014 | Thompson, Sr. et al. |
| 2014/0323360 A1 | 10/2014 | Comarin et al. |
| 2014/0323362 A1 | 10/2014 | Falana et al. |
| 2015/0007989 A1 | 1/2015 | Tan et al. |
| 2015/0011440 A1 | 1/2015 | Zamora et al. |
| 2015/0051311 A1 | 2/2015 | Zamora et al. |
| 2015/0068747 A1 | 3/2015 | Hwang et al. |
| 2015/0072901 A1 | 3/2015 | Samuel et al. |
| 2015/0087561 A1 | 3/2015 | Falana et al. |
| 2015/0087562 A1 | 3/2015 | Falana et al. |

METHODS FOR FRACTURING FORMATIONS USING AGGREGATING COMPOSITIONS

RELATED APPLICATIONS

This application is a divisional of U.S. patent application Ser. No. 14/582,661 filed 24 Dec. 2014, which is a continuation of U.S. patent application Ser. No. 13/247,985 filed 28 Sep. 2011, now U.S. Pat. No. 8,944,164 issued 3 Feb. 2015.

BACKGROUND OF THE INVENTION

1. Field of the Invention

Embodiments of the present invention relate to: (1) aggregating agents for treating solid materials, surfaces, and/or substrates including metal oxide or ceramic solid materials, surfaces, and/or substrates (natural or synthetic), metallic solid materials, surfaces, and/or substrates, polymeric or plastic solid materials, surfaces, and/or substrates (natural or synthetic), solid plant materials, surfaces, and/or substrates, or other types of solid materials, surfaces, or substrates, (2) treated materials and (3) methods for making and using same.

More particularly, embodiments of the present invention relates to aggregating agents for particulate solid materials, surfaces, and/or substrates, where the aggregating agents modify surface properties of the materials, surfaces, and/or substrates increasing their aggregating propensity or properties. The present invention also relates to coated or modified materials, surfaces, or substrates, where the coating modifies an aggregating propensity of the materials, surfaces, or substrates. The present invention also relates to methods for altering an aggregation propensity of materials, surfaces, or substrates especially in downhole applications and in any other application, where altering an aggregation propensity of particulate solid materials, surfaces, or substrates is desirable or beneficial.

2. Description of the Related Art

Historically, the problem of aggregating particulate materials downhole has been addressed using epoxy resins, phenolic resins and tackifying agents as described in U.S. Pat. Nos. 5,833,000; 5,871,049; 5,775,425; and 5,787,986.

More recently, reactions products alkyl pyridines and phosphate esters were introduced as inner salt of alkyl pryridinium phosphate ester products, which resulted in a decrease in a zeta potential of the substrate and therefore helped agglomeration properties of the as set forth in U.S. Pat. No. 7,392,847.

Although there products are useful for aggregating or agglomerating particulates and treating formation surfaces to alter a zeta potential of the surfaces and/or particles, there is still an need in the art for products that can augment aggregating or agglomerating properties of particles and/or surfaces and/or augment zeta potentials of particles and/or surfaces.

SUMMARY OF THE INVENTION

Compositions

Embodiments of the present invention provide aggregating compositions for treating solid particles, surfaces and/or materials, where the compositions comprise amines including heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes, which form complete or partial coating on the particles, surfaces and/or materials altering self-aggregating properties and/or aggregation propensities of the particles, surfaces, and/or materials.

Embodiments of the present invention provide particles, surfaces, and/or materials including a partial or complete coating of an aggregating composition of this invention, where the partial or complete coating alters self-aggregating properties and/or aggregation propensities of the particles, surfaces, and/or materials.

Embodiments of the present invention provide coatings of an aggregating composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes, where the coatings deform under pressure and impart an enhanced aggregating propensity to the particles, surfaces and/or materials.

Embodiments of the present invention provide a structure or substrate having surfaces partially or completed coated with an aggregating composition comprise heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes, where the coating is deformable and where the substrate is ideally suited for filtering fines and/or other particulate materials form a fluid, especially fluids used in oil/gas well drilling, completion, production, fracturing, propping, other production enhancing processes or other related applications. The substrates or structures can be ceramic or ceramic fibers or wools coated partially or completely with the compositions of this invention. Such substrates or structures are well suited for filter media to be used with or without screens.

Method for Treating

Embodiments of the present invention provide methods for changing or altering an aggregation potential or propensity of a solid particles, surfaces, and/or materials, where the method includes the step of contacting the particles, surfaces, and/or materials with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes under conditions sufficient for the composition to form partial or complete coatings on particles, surfaces, and/or materials.

Methods for Using the Treating Methods

Fracturing

Embodiments of the present invention provide methods for fracturing a formation including the step of pumping a fracturing fluid including a proppant into a producing formation at a pressure sufficient to fracture the formation and to enhance productivity, where the proppant props open the formation after fracturing and where the proppant comprises a solid particles treated with a treating composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes under conditions sufficient for the composition to form a partial or complete coating on the particles.

Embodiments of the present invention provide methods for fracturing a formation including the step of pumping a fracturing fluid including a proppant and an aggregating composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes into a producing formation at a pressure sufficient to fracture the formation and to enhance productivity. The composition results in a modification of an aggregation propensity, and/or zeta-potential of the proppant, formation particles and/or formation surfaces so that the formation particles and/or proppant aggregate and/or cling to the formation surfaces.

Embodiments of the present invention provide methods for fracturing a formation including the step of pumping a fracturing fluid including an aggregating composition comprising heterocyclic aromatic amines, substituted heterocyclic aromatic amines, polyvinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes into a producing formation at a pressure sufficient to fracture the formation and to enhance productivity. The composition results in a altering an aggregation propensity, potential and/or zeta-potential of the formation particles and/or formation surfaces so that the formation particles aggregate and/or cling to the formation surfaces. The methods may also include the step of pumping a proppant comprising a uncoated and/or coated particles after fracturing so that the particles prop open the fracture formation and where the coated particles tend to aggregate on the formation surfaces and/or formation particles formed during fracturing.

Drilling

Embodiments of the present invention provide methods for drilling including the step of while drilling, circulating a drilling fluid, to provide bit lubrication, heat removal and cutting removal, where the drilling fluid includes an aggregating composition comprising heterocyclic aromatic amines, substituted heterocyclic aromatic amines, polyvinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes. The compositions alters an aggregation potential or propensity and/or a zeta potential of particulate materials in the drilling fluid or that becomes entrained in the drilling fluid to increase solids removal. The methods may be operated in over-pressure conditions, under-balanced conditions or under managed pressure conditions. The methods are especially well tailored to under-balanced or managed pressure conditions.

Embodiments of the present invention provide methods for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes to provide bit lubrication, heat removal and cutting removal and to alter an aggregation potential or an absolute value of a zeta potential of the particulate solids in the drilling fluid or formation or that becomes entrained in the drilling fluid to increase solids removal and to decrease particles flowing from the formation into the drilling fluid. The methods may be operated in over-pressure conditions or under-balanced conditions or under managed pressure conditions. The methods are especially well tailored to under-balanced or managed pressure conditions.

Embodiments of the present invention provide methods for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes to provide bit lubrication, heat removal and cutting removal and to increase an aggregation potential or decrease in the absolute value of the zeta potential of any particulate solids in the drilling fluid or that becomes entrained in the drilling fluid to increase solids removal. After passing through the structure that produces an undesired quantities of particulate solids, change the second drilling fluid to the first drilling fluid or a third drilling fluid. The methods may be operated in over-pressure conditions or under-balanced conditions or under managed pressure conditions. The methods are especially well tailored to under-balanced or managed pressure conditions.

Producing

Embodiments of the present invention provide methods for producing including the step of circulating and/or pumping a fluid into a well on production, where the fluid includes a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes, which alters an aggregation potential or an absolute value of a zeta potential of any particulate solids in the fluid or that becomes entrained in the fluid to increase solid particle removal and to decrease the potential of the particles to plug the formation and/or the production tubing.

Embodiments of the present invention provide methods for controlling sand or fines migration including the step of pumping a fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated monomers and diene monomers), or mixtures or combinations thereof in the absence of phosphate esters, optionally ethoxylated alcohols, and optionally glymes through a matrix at a rate and pressure into a formation to control sand and fine production or migration into the production fluids.

Embodiments of the present invention provide other methods for controlling sand or fines migration including the step of depositing a coated particulate solid material of this invention adjacent screen-type sand and fines control devices so that the sand and/or fines are attracted to the coated particles and do not encounter or foul the screen of the screen-type device.

DETAILED DESCRIPTION OF THE INVENTION

The inventors have found that aggregating compositions can be prepared that alter an aggregation propensity, aggregation potential and/or a zeta potential of solid particles, surfaces, and/or materials, when the particles, surfaces and/or materials are treated with an amount of the compositions sufficient to form partial or complete coating on the particles, surfaces, and/or materials. The inventors have also found that particles, surfaces, and/or materials may be treated with the compositions of this invention, where the particles, surfaces and/or materials are coated partially or completely with the composition to form modified or coated particles, surfaces, and/or materials. The resulting modified or coated particles, surfaces and/or materials have improved aggregation tendencies and/or propensities and/or altered particle zeta potentials. The inventors have also found that the compositions, the modified metal-oxide-containing particles, surfaces and/or materials may be used in oil field applications including drilling, fracturing, producing, injecting, sand control, or any other downhold application. The inventors have also found that the modified particulate metal-oxide-containing solid particles or particles of any other solid material may be used in any other application, where increased particle aggregation potentials are desirable or where decreased absolute values of the zeta potential of the particles, which is a measure of aggregation propensity. The inventors have also found that a coated particulate metal-oxide-containing solid compositions may be formed, where the coating is deformable and the coated particles tend to self-aggregate and tend to cling to surfaces having similar coatings or having similar chemical and/or physical properties to that of the coating. That is to say, the coated particles tend to prefer like compositions, which increases their self-aggregation propensity and increases their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack. What is very surprising and unexpected about the present compositions is that the coating are formed in the absence of phosphate esters. In the prior applications cited above, the coating that were formed required a reaction produce between an amine and a phosphate ester. The fact that compositions comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof would be able to modify the aggregating propensity of surface and particles treated with the composition.

In the case of drilling, the compositions of this invention may be used to coat the formation and formation cuttings during drilling, because the particle tend to self aggregate and/or cling to similarly modified particles and/or formation surfaces. Again, an advantage of the self-aggregation is a reduced tendency of the cuttings to foul or plug screens. Additional advantages are to coat the formation walls with a composition of this invention during drilling to consolidate the formation and to consolidate or aggregate fines or particles in the drilling fluid to keep the rheological properties of the drilling fluid from changing and increasing equivalent circulating density (ECD).

One problem in oil and gas production from wells is the control of the co-production of fines and sand from producing formations. Besides the co-production of particulate materials during oil and/or gas production from wells, flowback of proppant and/or fines after formation fracturing is also a problem. Additionally, it has been found that Steam Assisted Gravity Drainage (SAGD) processing of oil and/or gas wells de-stabilizes sand/fines during and after steam injection during SAGD processing.

Certain embodiments of this invention relate to aggregating compositions comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, optionally ethoxylated alcohols, and optionally glymes.

Basically the difference of this system compared to the previously patented system cited above is that this new systems are not reaction products of heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof with a phosphate ester. Thus, the present aggregating compositions are basically high molecular weight heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in a carrier. The compositions may also include ethoxylated alcohols, and glymes Compositions Embodiments of the present invention broadly relate to compositions including aggregating systems including one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof. In certain embodiments, the compositions of this invention include high molecular weight one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof in a carrier, in the absence of phosphate esters. The compositions may also include ethoxylated alcohols, and glymes. The compositions modify surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate and/or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

Embodiments of the present invention also broadly relate to structures and substrates treated with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, where the structures and substrates include surfaces that are partially or completely coated with a composition of this invention. The compositions may also include ethoxylated alcohols, and glymes. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

Embodiments of the present invention broadly relate to methods for treating metal oxide-containing surfaces including the step of contacting the metal oxide-containing surface with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters. The compositions may also include ethoxylated alcohols, and glymes. The compositions are thought to form a coating on the surface altering the properties of the surface so that the surface is now capable of interacting with similarly treated surfaces to form agglomerated and/or aggregated structures. The treating may be designed to coat continuous metal oxide containing surfaces and/or the surfaces of metal oxide containing particles. If both are treated, then the particles cannot only self-aggregate, but the particles can also aggregate, agglomerate and/or cling to the coted continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

Embodiments of the present invention broadly relate to methods for fracturing a formation including the step of pumping a fracturing fluid including a composition comprising heterocyclic aromatic amines, substituted heterocyclic aromatic amines, polyvinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters into a producing formation at a pressure sufficient to fracture the formation. The compositions may also include ethoxylated alcohols, and glymes. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention may also be used in a pre-pad step to modify the surfaces of the formation so that during fracturing the formation surfaces are pre-coated. The pre-pad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters as proppant. The compositions may also include ethoxylated alcohols, and glymes. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping.

Method for Drilling

Embodiments of the present invention also broadly relate to methods for drilling including the step of, while drilling, circulating a drilling fluid to provide bit lubrication, heat removal and cutting removal, where the drill fluid includes a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, which increases an aggregation potential or decrease an absolute value of the zeta potential of any particulate solids in the drilling fluid or that becomes entrained in the drilling fluid to increase solids removal. The compositions may also include ethoxylated alcohols, and glymes.

Embodiments of the present invention also broadly relate to methods for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters to provide bit lubrication, heat removal and cutting removal and to increase an aggregation potential or decrease an absolute value of the zeta potential of any solid including particulate metal oxide-containing solids in the drilling fluid or that becomes entrained in the drilling fluid to increase solids removal. The compositions may also include ethoxylated alcohols, and glymes.

Embodiments of the present invention also broadly relate to methods for drilling including the step of, while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters to provide bit lubrication, heat removal and cutting removal and to increase an aggregation potential or zeta potential of any particulate solid including metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid. The compositions may also include ethoxylated alcohols, and glymes.

Method for Producing

Embodiments of the present invention also broadly relate to methods for producing including the step of circulating and/or pumping a fluid into, where the fluid includes a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof in the absence of phosphate esters, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing. The compositions may also include ethoxylated alcohols, and glymes.

Suitable Materials for Use in the Invention

Suitable amines capable of forming a deformable coating on a solid particles, surfaces, and/or materials include, without limitation, heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof, where the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. In certain embodiments, amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the poly vinyl heterocyclic amines include, without limitation, polymers and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof. In certain embodiments, the heterocyclic aromatic amines comprise HAP™-310 available from Vertellus Specialties Inc.

Suitable glymes including, without limitation, diethylene glycol dimethyl ether, ethylene, propylene glycol dimethyl ether, dipropylene glycol dimethyl ether, diethylene glycol diethyl ether, ethylene, propylene glycol diethyl ether, dipropylene glycol diethyl ether, or mixture or combinations thereof. In certain embodiments, the glyme is dipropylene glycol dimethyl ether sold as Proglyme from Novolyte Technologies of Independence, Ohio.

Suitable carriers for use in the present invention include, without limitation, low molecular weight alcohols having between 1 and 5 carbon atoms, where one or more of the carbon atoms may be oxygen or mixtures or combinations thereof. Exemplary examples include methanol, ethanol, propanaol, isopropyl alcohol, butanol, isobutanol, pentanol, isopentanol, neopentanol or mixture or combinations thereof.

Suitable ethoxylated alcohols include, without limitation, any ethoxylated alcohol having an HLB value between about 6 and 10 or mixtures or combinations thereof. In other, embodiments, the ethoxylated alcohol having an HLB value between about 7 and 9 or mixtures or combinations thereof. In other embodiments, ethoxylated alcohol having an HLB value between about 7.5 and 8.5 or mixtures or combinations thereof. In other embodiments, ethoxylated alcohol having an HLB value between about 8 or mixtures or combinations thereof. Exemplary ethoxylated alcohols include, without limitation, $C_{12}$-$C_{18}$ alcohols, linear or branched, and 2 to 6 ethoxylations (2 to 6 ethyleneoxide units) per alcohol or mixtures or combinations thereof. In certain embodiments, the ethoxylated alcohols include $C_{12}$-$C_{14}$ alcohols, linear or branched with 2 to 5 ethoxylations (2 to 5 ethyleneoxide units) per alcohol or mixtures or combinations thereof. In certain embodiments, the ethoxylated alcohols include $C_{12}$ alcohols, linear or branched with 2 to 5 ethoxylations (2 to 5 ethyleneoxide units) per alcohol or mixtures or combinations thereof. In certain embodiments, the ethoxylated alcohols include $C_{13}$ alcohols, linear or branched with 2 to 5 ethoxylations (2 to 5 ethyleneoxide units) per alcohol. In certain embodiments, the ethoxylated alcohols include $C_{14}$ alcohols, linear or branched with 2 to 5 ethoxylations (2 to ethyleneoxide units) per alcohol or mixtures or combinations thereof In certain embodiments, the ethoxylated alcohol is an ethoxylated iso-tridecyl alcohol such as ALFONIC® TDA-3 available for Sasol North Americas, Inc.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Compositional Ranges and Properties

Embodiments of the aggregating compositions of this invention including:

from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;

from about 10 wt. % to about 30 wt. % of a carrier, from about 0 wt % to about 30 wt. % of a glyme, and from about 0 wt. % to about 10 wt. % of an ethoxylated acohol having an HLB value between about 6 and about 10.

In other embodiments of the aggregating compositions of this invention including:

from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;

from about 10 wt. % to about 25 wt. % of a carrier, from about 0 wt % to about 25 wt. % of a glyme, and from about 0 wt. % to about 10 wt. % of an ethoxylated acohol having an HLB value between about 6 and about 10.

In other embodiments of the aggregating compositions of this invention including:

from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;

from about 10 wt. % to about 25 wt. % of a carrier, from about 1 wt % to about 25 wt. % of a glyme, and from about 0.5 wt. % to about 10 wt. % of an ethoxylated acohol having an HLB value between about 6 and about 10.

In other embodiments of the aggregating compositions of this invention including:

from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;
   from about 10 wt. % to about 25 wt. % of a carrier,
   from about 2 wt % to about 25 wt. % of a glyme, and
   from about 1 wt. % to about 10 wt. % of an ethoxylated acohol having an HLB value between about 6 and about 10.

In other embodiments of the aggregating compositions of this invention including:
   from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;
   from about 10 wt. % to about 25 wt. % of a carrier,
   from about 5 wt % to about 25 wt. % of a glyme, and
   from about 1 wt. % to about 9 wt. % of an ethoxylated acohol having an HLB value between about 6 and about 10.

In other embodiments of the aggregating compositions of this invention including:
   from about 50 wt. % to about 80 wt. % of a heterocyclic aromatic amine, a substituted heterocyclic aromatic amine, poly vinyl heterocyclic aromatic amine, a co-polymer of vinyl heterocyclic aromatic amine and non amine polymerizable monomers (ethylenically unsaturated mononers and diene monomers), or mixtures or combinations thereof;
   from about 10 wt. % to about 25 wt. % of a carrier,
   from about 5 wt % to about 25 wt. % of a glyme, and
   from about 1 wt. % to about 8 wt. % of an ethoxylated acohol having an HLB value between about 6 and about 10.

Embodiments of the aggregating compositions of this invention may also be tailored to have a specific agglomerating effect on particulate material such as sand. By varying the about of the ethoxylated alcohol component, the agglomerating effect may be tuned from good, to average to poor. This tailoring ability may be adjusted on the fly, simply by changing the relative amount of the ethoxylated alcohol component in the aggregating composition. For compositions having good agglomerating properties, the ethoxylated alcohol contents ranges from 0 wt. % to about 4 wt. %. For compositions having average agglomerating properties, the ethoxylated alcohol contents ranges from 5 wt. % to about 7 wt. %. For compositions having poor agglomerating properties, the ethoxylated alcohol contents is greater than 7 wt. % and generally, between about 8 wt. % to about 15 wt. %.

Experiments of the Invention

EXAMPLE 1

Tests Replacing MeOG and EG from the Formualtions

| Formula 1 | Formula 3 | Formula 5 | Formula 6 |
|---|---|---|---|
| 23% Methanol | 23% IPA | 20% IPA | 20% IPA |
| 77% HAP-310 | 23% Proglyme | 23% Proglyme | 16% Proglyme |
|  | 54% HAP-310 | 3% TDA-3 | 10% TDA-3 |
|  |  | 54% HAP-310 | 54% HAP-310 |

ALFONIC ® TDA-3 Ethoxylate - Isotridecanol, ethoxylated, available from Sasol North America Inc. of Houston, TX 77079
Proglyme $C_8H_{18}O_3$ available from Novolyte Technologies, Inc. of Cleveland, Ohio
HAP ™-310 available from Vertellus Specialties Inc.

| Formula | Agglomeration |
|---|---|
| HAP:Proglyme (50:50) & 1% TDA-3 | Good |
| HAP:Proglyme (50:50) & 6% TDA-3 | Average |
| HAP:Proglyme (50:50) & 10% TDA-3 | Poor |
| HAP:Proglyme (50:50) & 15% TDA-3 | Poor |
| SandAid & 0.5% TDA-3 | Good |
| SandAid & 1.0% TDA-3 | Good |
| SandAid & 2.0% TDA-3 | Good |
| SandAid & 3.0% TDA-3 | Good |
| SandAid & 4.0% TDA-3 | Good |
| SandAid & 6.0% TDA-3 | Average |
| SandAid & 10% TDA-3 | Poor |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising the step of:
   pumping, into the formation at a pressure sufficient to fracture the formation, a fracturing fluid comprising:
   an aggregating composition comprising heterocyclic aromatic amines, substituted heterocyclic aromatic amines, or mixtures and combinations thereof in the absence of phosphate ester,
   where the aggregating composition results in a modification of a zeta-potential of the formation surfaces and/or formation particles so that the formation particles aggregate and/or cling to the formation surfaces.

2. The method of claim 1, wherein, in the pumping step, the fracturing fluid further comprises:
   a proppant,
   where the aggregating composition results in a modification of an aggregating propensity and/or a zeta-potential of the proppant so that the proppant aggregate and/or cling to the formation surfaces and where the proppant props open fractures produced in the formation during and after the fracturing step.

3. The method of claim 2, wherein, in the pumping step, the proppant comprises:
   a coated proppant comprising a solid particulate material coated with a coating composition,
   where the coating composition comprises a heterocyclic aromatic amine, a substituted heterocyclic aromatic amine, or mixtures and combinations thereof in the absence of a phosphate ester or a phosphate ester-amine reaction product and where the material is treated with the coating composition under conditions sufficient for the coating composition to form a partial or complete coating on the particles of the particulate material.

4. The method of claim 1, wherein, in the pumping step, the aggregating composition further comprises ethoxylated alcohols, or glymes or a carrier or mixtures and combinations thereof.

5. The method of claim 4, wherein, in the pumping step, the carrier comprising low molecular weight alcohols having between 1 and 5 carbon atoms or mixtures and combinations thereof, where one or more of the carbon atoms may be an oxygen atom.

6. The method of claim 1, wherein, in the pumping step: the heterocyclic aromatic amines comprise aniline, pyridines, pyrrole, piperidine, pyrrolidine, indole, imidazole, quinoline, isoquinoline, pyrazine, quinoxaline, acridine, pyrimidine, quinazoline, or mixtures and combinations thereof, and the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

7. The method of claim 6, wherein, in the pumping step, the heterocyclic aromatic amines, substituted heterocyclic aromatic amines comprise aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

8. The method of claim 1, wherein, in the second pumping step, the aggregating composition further comprising:
poly vinyl heterocyclic aromatic amines, co-polymers of vinyl heterocyclic aromatic amine and non amine polymerizable monomers, or mixtures and combinations thereof,
the non amine polymerizable monomers are ethylenically unsaturated mononers and diene monomers,
the polymers and copolymers comprise polymer and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof.

9. The method of claim 1, further comprising the step of:
pumping a second fracturing fluid comprising a proppant composition including a uncoated proppant and/or coated proppant so that the proppant prop open the fracture formation and where the coated particles tend to aggregate in the fractures and adhere to fracture surfaces improving propping of the fractures.

10. The method of claim 9, wherein, in the second pumping step, the second fracturing fluid further comprising:
an aggregating composition comprising heterocyclic aromatic amines, or mixtures and combinations thereof in the absence of phosphate ester,
where the aggregating composition results in a modification of a zeta-potential of the formation surfaces and/or formation particles so that the formation particles aggregate and/or cling to the formation surfaces.

11. The method of claim 10, wherein, in the second pumping step, the aggregating composition further comprises ethoxylated alcohols, or glymes or a carrier or mixtures and combinations thereof.

12. The method of claim 11, wherein, in the second pumping step, the carrier comprising low molecular weight alcohols having between 1 and 5 carbon atoms or mixtures and combinations thereof, where one or more of the carbon atoms may be an oxygen atom.

13. The method of claim 12, wherein, in the second pumping step, the aggregating composition further comprising:
poly vinyl heterocyclic aromatic amines, co-polymers of vinyl heterocyclic aromatic amine and non amine polymerizable monomers, or mixtures and combinations thereof,
the non amine polymerizable monomers are ethylenically unsaturated mononers and diene monomers,
the polymers and copolymers comprise polymer and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof, the heterocyclic aromatic amines comprise aniline, pyridines, pyrrole, piperidine, pyrrolidine, indole, imidazole, quinoline, isoquinoline, pyrazine, quinoxaline, acridine, pyrimidine, quinazoline, or mixtures and combinations thereof, and the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

14. A method for fracturing a formation comprising the step of:
pumping, into the formation at a pressure sufficient to fracture the formation, a fracturing fluid comprising:
from about 50 wt. % to about 80 wt. % of aromatic amines, substituted aromatic amines, or mixtures or combinations thereof and from about 10 wt. % to about 30 wt. % of a carrier, in the absence of a phosphate ester.

15. The method of claim 14, wherein, in the pumping step, the fracturing fluid further comprising:
a coated proppant comprising a solid particulate material coated with a coating composition comprising:
from about 50 wt. % to about 80 wt. % of aromatic amines, substituted aromatic amines, or mixtures or combinations thereof, and from about 10 wt. % to about 30 wt. % of a carrier, in the absence of a phosphate esters, where the coating composition forms a deformable complete or partial coating on formation surfaces altering zeta-potential of the surfaces enhancing particle adhesion to the surfaces.

16. The method of claim 14, wherein, in the pumping step, the carrier comprising low molecular weight alcohols having between 1 and 5 carbon atoms or mixtures and combinations thereof, where one or more of the carbon atoms may be an oxygen atom.

17. The method of claim 14, wherein, in the pumping step, the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

18. The method of claim 14, wherein, in the pumping step, the amines comprises aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

19. The method of claim 14, wherein, in the pumping step, the coating composition further includes polymers and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof.

20. The method of claim 14, wherein, in the pumping step, the coating composition further includes from about 0.5 wt. % to about 10 wt. % ethoxylated alcohols, and from about 1 wt % to about 25 wt. % glymes.

* * * * *